United States Patent
Kwatra et al.

(10) Patent No.: US 12,147,803 B2
(45) Date of Patent: Nov. 19, 2024

(54) OPTIMIZED BUILD ENVIRONMENT ON CLOUD PLATFORMS FOR SOFTWARE DEVELOPMENT, SECURITY, AND OPERATIONS

(71) Applicant: INTERNATIONAL BUSINESS MACHINES CORPORATION, Armonk, NY (US)

(72) Inventors: Shikhar Kwatra, San Jose, CA (US); Richard Daniel Gunjal, Bangalore (IN); Tiberiu Suto, Franklin, NY (US); Pedro Andres Guzman Benavides, Moravia (CR); Nadiya Kochura, Bolton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 17/944,377

(22) Filed: Sep. 14, 2022

(65) Prior Publication Data
US 2024/0086190 A1 Mar. 14, 2024

(51) Int. Cl.
*G06F 8/77* (2018.01)
*H04L 9/40* (2022.01)

(52) U.S. Cl.
CPC ............. *G06F 8/77* (2013.01); *H04L 63/20* (2013.01)

(58) Field of Classification Search
CPC ........................................................ G06F 8/70
See application file for complete search history.

(56) References Cited

U.S. PATENT DOCUMENTS

| 10,872,029 | B1  |   | 12/2020 | Bawcom |             |
|------------|-----|---|---------|--------|-------------|
| 11,409,865 | B1  | * | 8/2022  | Kliger | G06F 21/64  |
| 11,429,353 | B1  |   | 8/2022  | Liguori et al. |     |
| 11,853,197 | B2  | * | 12/2023 | Leasck | G06F 11/3688 |

(Continued)

OTHER PUBLICATIONS

Anonymous, "GitHub Copilot—Your AI pair programmer", https://copilot.github.com/, printed on Sep. 28, 2022, 10 pages.

(Continued)

*Primary Examiner* — Jae U Jeon
(74) *Attorney, Agent, or Firm* — Jared Chaney; Andrew D. Wright; Calderon Safran & Wright P.C.

(57) ABSTRACT

Aspects of the present disclosure relate generally to software development environments and, more particularly, to systems, computer program products, and methods of automating software development, security, and operations (DevSecOps). For example, a computer-implemented method includes receiving, by a processor, a plurality of infrastructure as code files specifying a configuration of a runtime environment for a deployable image of source code in a continuous integration and continuous delivery pipeline for a cloud platform; generating, by the processor, compliance code for at least one file of the plurality of infrastructure as code files; building, by the processor, the deployable image of the source code in the continuous integration and continuous delivery pipeline according to the configuration specified by the plurality of infrastructure as code files and the compliance code; and deploying, by the processor, an instance of the image in the runtime environment.

20 Claims, 8 Drawing Sheets

(56) References Cited

U.S. PATENT DOCUMENTS

| | | | |
|---|---|---|---|
| 2016/0004517 A1* | 1/2016 | Safary | G06F 8/436 |
| | | | 717/131 |
| 2019/0114320 A1* | 4/2019 | Patwardhan | G06F 40/289 |
| 2019/0213326 A1* | 7/2019 | Dykes | G06F 21/552 |
| 2019/0356556 A1* | 11/2019 | Vicat-Blanc | G06F 30/20 |
| 2020/0012480 A1 | 1/2020 | Rizo et al. | |
| 2021/0055927 A1 | 2/2021 | Sarukkai et al. | |
| 2021/0056211 A1* | 2/2021 | Olson | G06N 3/08 |
| 2021/0097344 A1* | 4/2021 | Goldstein | G06V 30/2504 |
| 2021/0109725 A1* | 4/2021 | Du | G06F 8/10 |
| 2023/0067222 A1* | 3/2023 | Filji | G06F 21/577 |

OTHER PUBLICATIONS

Rivera, "Building CI/CD pipelines using dynamic config", Tutorial, circleci Blog, Apr. 28, 2021, https://circleci.com/blog/building-cicd-pipelines-using-dynamic-config/, 14 pages.

Anonymous, "Cloud Build", https://cloud.google.com/build, printed on Sep. 28, 2022, 12 pages.

Kulla-Mader et al., "Securing Azure Pipelines", Microsoft Learn, https://docs.microsoft.com/en-us/azure/devops/migrate/security-validation-cicd-pipeline?view=azure-devops, Feb. 11, 2022, 2 pages.

Bidabadi, "Enable Security in the CI/CD Pipeline with DevSecOps", Fortinet, https://www.fortinet.com/blog/business-and-technology/ensuring-continuous-security-integration-for-devsecops, Oct. 2, 2020, 8 pages.

Anonymous, Infrastructure as Code, IBM Cloud Education, https://www.ibm.com/cloud/learn/infrastructure-as-code, Dec. 2, 2019, 9 pages.

Anonymous, "Powerful Policy-Based Configuration Management System Software", Video, Chef Infra | Chef, https://www.chef.io/chef/, printed on Sep. 28, 2022, 9 pages.

Anonymous, Puppet by Perforce, webpage, https://puppet.com/, printed on Sep. 28, 2022, 8 pages.

Anonymous, AWS Amazon webpage, https://aws.amazon.com/, printed on Sep. 28, 2022, 13 pages.

Anonymous, "Set Up a CI/CD Pipeline on AWS", https://aws.amazon.com/getting-started/projects/set-up-ci-cd-pipeline/, printed on Sep. 28, 2022, 5 pages.

Anonymous, "What is Continuous Delivery?", Amazon Web Services, printed on Sep. 28, 2022, 6 pages.

Anonymous, "Infrastructure as Code—Explore—Google Trends", https://trends.google.com/trends/explore?date=all&q=Infrastructure%20as%20Code, printed on Sep. 28, 2022, 2 pages.

Borovits et al., "DeepIaC: Deep Learning-Based Linguistic Anti-pattern Detection in IaC," https://doi.org/10.48550/ arXiv.2009.10801, Nov. 13, 2020, 6 pages.

International Search Report issued on Nov. 8, 2023 in Application No. PCT/IB2023/056668; 19 pages.

* cited by examiner

OPTIMIZED BUILD ENVIRONMENT ON CLOUD PLATFORMS FOR SOFTWARE DEVELOPMENT, SECURITY, AND OPERATIONS

BACKGROUND

Aspects of the present invention relate generally to software development environments and, more particularly, to systems, computer program products, and methods of automating software development, security, and operations (DevSecOps).

Infrastructure as code (IaC) is the practice to automatically configure system dependencies and to provision local and remote instances of software deployment. Practitioners consider IaC as a fundamental pillar to implement software development and operations (DevOps) practices for rapid delivery of software and services to end-users. For companies creating cloud-based projects that leverage IaC, strategies for identifying any defects or security flaws during the development and deployment of the environment are useful for corporate compliance and auditing.

SUMMARY

In a first aspect of the invention, there is a computer-implemented method including: receiving, by a processor, a plurality of infrastructure as code files specifying a configuration of a runtime environment for a deployable image of source code in a continuous integration and continuous delivery pipeline for a cloud platform; generating, by the processor, compliance code for at least one file of the plurality of infrastructure as code files; building, by the processor, the deployable image of the source code in the continuous integration and continuous delivery pipeline according to the configuration specified by the plurality of infrastructure as code files and the compliance code; and deploying, by the processor, an instance of the image in the runtime environment.

In another aspect of the invention, there is a computer program product including one or more computer readable storage media having program instructions collectively stored on the one or more computer readable storage media. The program instructions are executable to: input features of each of a plurality of code files in a continuous integration and continuous delivery pipeline for a cloud platform into a machine learning model trained with test data, including examples of non-compliant code with a security vulnerability; detect by the machine learning model non-compliant code in at least one of the plurality of code files in the continuous integration and continuous delivery pipeline for the cloud platform; build a deployable image of source code in the continuous integration and continuous delivery pipeline according to a configuration of a runtime environment specified by the plurality of code files, including the at least one of the plurality of code files incorporating compliance code that remediates the security vulnerability; and deploy an instance of the image in the runtime environment.

In another aspect of the invention, there is system including a processor set, one or more computer readable storage media, and program instructions collectively stored on the one or more computer readable storage media. The program instructions are executable to: detect code that does not follow a compliance rule of security and compliance policies in at least one file of a plurality of infrastructure as code files in a continuous integration and continuous delivery pipeline for a cloud platform; append compliance code that follows the compliance rule of the security and compliance policies to the at least one file of the plurality of infrastructure as code files; and deploy in a runtime environment a deployable image of source code in the continuous integration and continuous delivery pipeline according to a configuration of the runtime environment specified by the plurality of infrastructure as code files, including the at least one file appended with the compliance code that follows the compliance rule.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
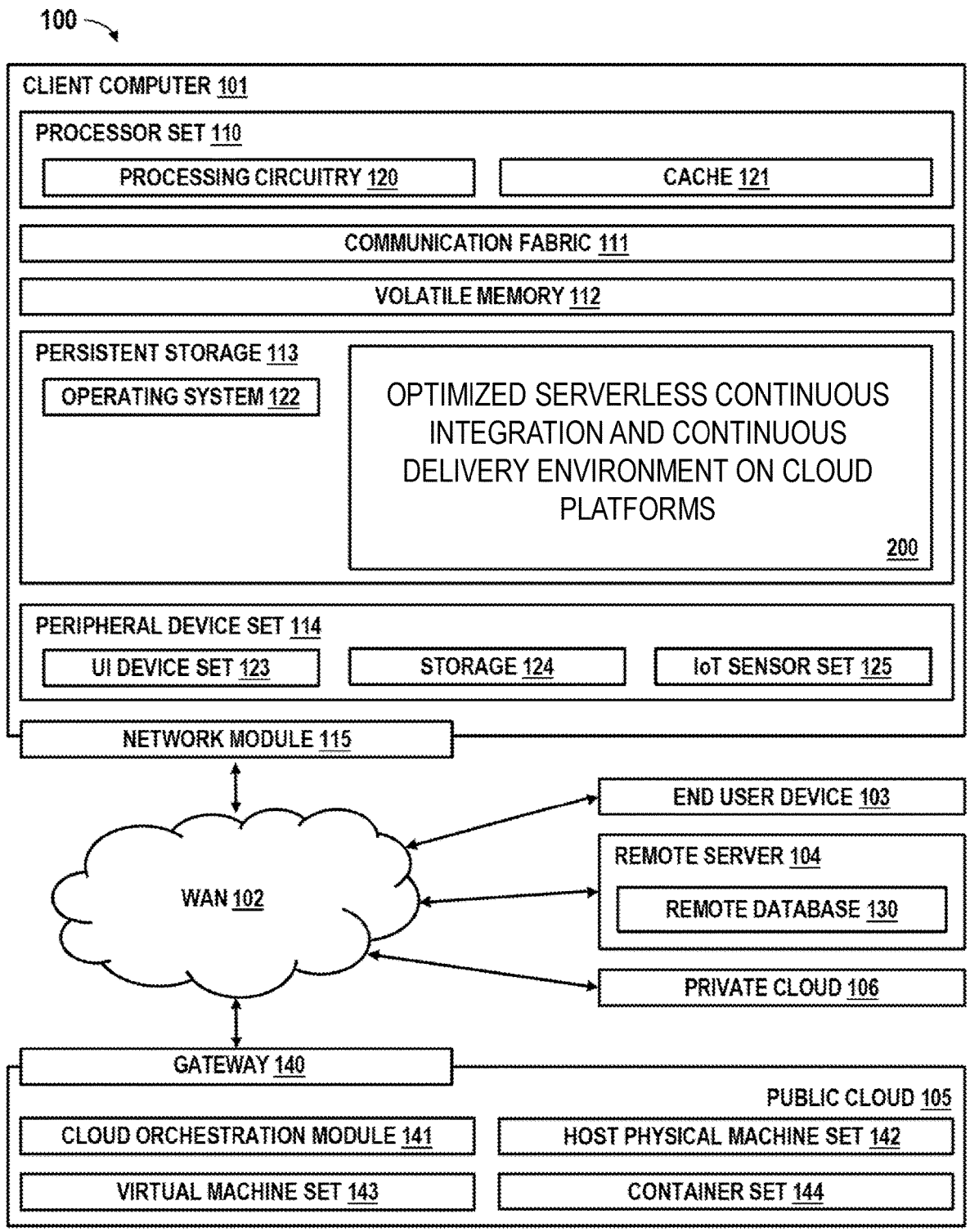
FIG. 1 depicts a computing environment according to an embodiment of the present invention.

Aspects of the present invention relate generally to software development environments and, more particularly, to systems, computer program products, and methods of automating software development, security, and operations (DevSecOps). More specifically, aspects of the invention relate to methods, computer program products, and systems for an optimized continuous integration and continuous delivery (CI/CD) pipeline environment that remediates non-compliant code and validates compliant code according to compliance and security policies of an enterprise in the development and deployment of serverless functions, microservices and Application Programming Interface (API) gateways on cloud platforms. An inefficient and inconsistent process occurs when cloud service providers rely on third party security consultants to support development of compliance and security in deployment of cloud services. According to aspects of the invention, the methods, systems, and computer program products described herein automatically detect and remediate non-compliant code as part of the process in the CI/CD environment and further validate the code is compliant as part of the deployment process.

In embodiments, the methods, systems, and program products described herein receive source code written for a serverless function and API gateway and CI/CD pipeline configuration files, including infrastructure as code (IaC) files specifying configuration of the cloud service, the events that trigger the function and the resources of a runtime environment, such as an infrastructure stack, to deploy the cloud service. The source code and CI/CD pipeline configuration files are processed as part of the CI/CD integration and delivery environment by applying a machine learning analysis such as a long short term memory (LSTM) analysis in a machine learning model trained with enterprise data and/or crowdsourced data. This analysis detects code that does not follow compliance rules of security and compliance policies. Compliance code is generated that follows compliance rules and is appended to the respective code file with the detected non-compliant code so that the code complies with the compliance rules. A deployable image of the service for the source code is built in the continuous integration and continuous delivery pipeline according to the configuration of the runtime environment specified by the pipeline configuration files, including files updated with compliance code. Additionally, the build of the deployable image is validated to verify the code is compliant with compliance rules as part of the deployment process, and the cloud service is deployed on the cloud platform.

Furthermore, the methods, systems, and program products used in embodiments of the present disclosure incorporate security/policy compliance into a DevSecOps pipeline by crowdsourcing compliance recommendations to common compliance security/policy issues (e.g., threats, vulnerabilities) and using a reward system (e.g., a reputation score) to recognize useful recommendations. The crowdsourced compliance recommendations are used as training data to train a cognitive engine to generate compliance code for input source code. The trained cognitive engine can, in turn, generate compliance code for a given set of serverless cloud computing code. The reward system can employ a blockchain to track individual compliance recommendations and reward contributors of the compliance recommendations based on success of the compliance recommendations against actual security/policy issues.

Aspects of the present invention are directed to improvements in computer-related technology and existing technological processes in a CI/CD environment for deploying cloud services. In embodiments, the system including a processor, a computer readable memory, one or more computer readable storage media, and program instructions collectively stored on the one or more computer readable storage media, may detect code that does not follow a compliance rule of security and compliance policies in a continuous integration and continuous delivery pipeline for a cloud service, append compliance code that follows the compliance rule of the security and compliance policies to remediate the non-compliant code, verify the code follows compliance rules of the security and compliance policies, and deploy the cloud service. These are specific improvements in the way computers may operate and interoperate to automatically detect and remediate non-compliant code and further validate that deployable cloud services comply with compliance and security policies of an enterprise.

Implementations of the disclosure describe additional elements that are specific improvements in the way computers may operate and these additional elements provide non-abstract improvements to computer functionality and capabilities. As an example, a computer program product including one or more computer readable storage media having program instructions collectively stored on the one or more computer readable storage media may input features of code files in a continuous integration and continuous delivery pipeline for a cloud service into a machine learning model trained with examples of non-compliant code with a security vulnerability, detect by the machine learning model non-compliant code in one or more code files in the continuous integration and continuous delivery pipeline for the cloud service, build a deployable image for the cloud service in the continuous integration and continuous delivery pipeline according to the configuration of a runtime environment specified by the code files, including the one or more code files incorporating compliance code that remediates the security vulnerability, and deploy the cloud service in the runtime environment.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as optimized serverless continuous integration and continuous delivery environment on cloud platforms for software development, security, and operations 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up the busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
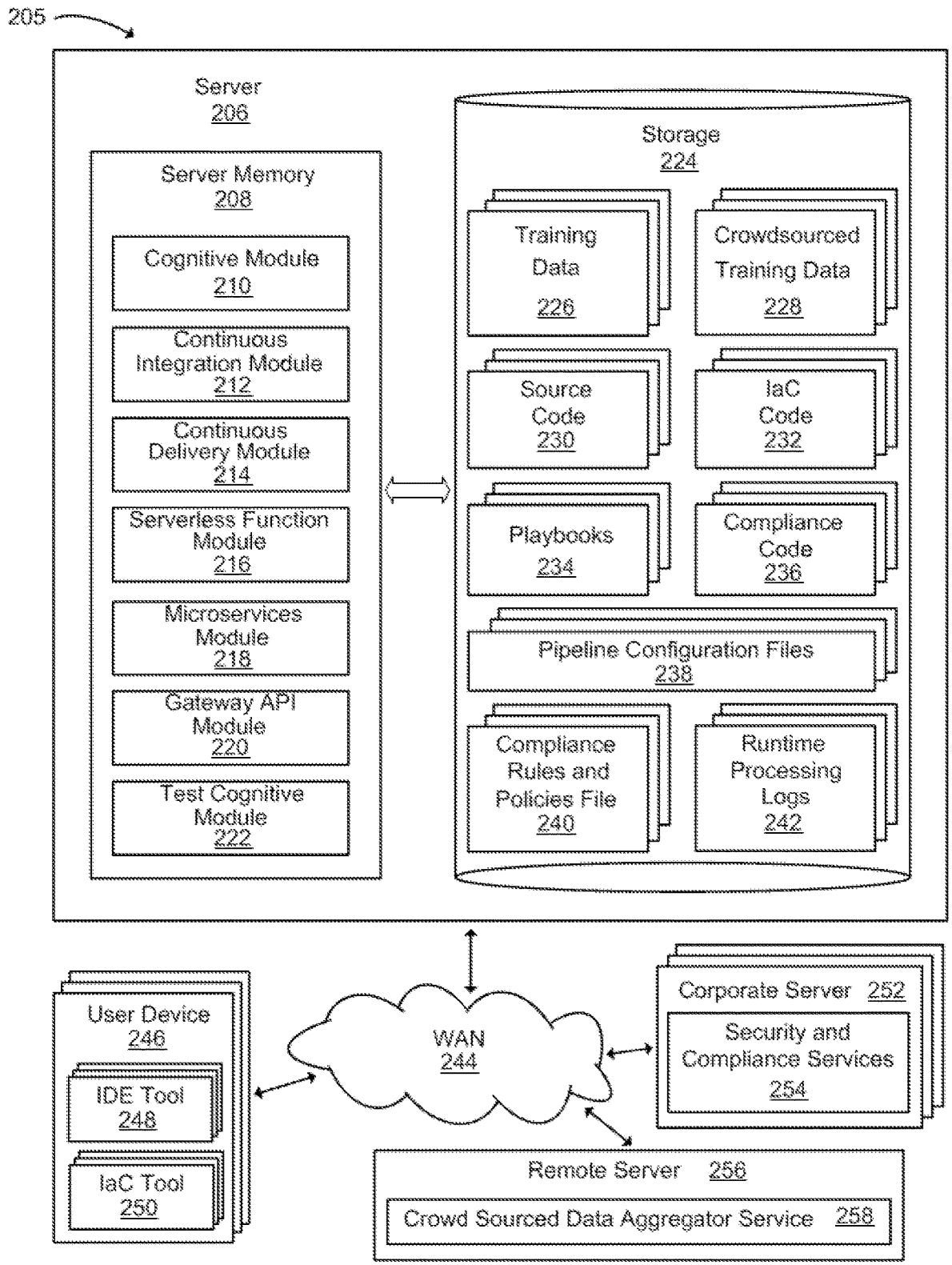
FIG. 2 shows a block diagram of an exemplary environment in accordance with aspects of the invention.

FIG. 2 shows a block diagram of an exemplary environment 205 in accordance with aspects of the invention. In embodiments, the environment includes a server 206, which may be a computer system such as a computer 101 described with respect to FIG. 1 with which end user devices 103 and remote servers 104, each also described with respect to FIG. 1, may communicate over a network such as WAN 102 described with respect to FIG. 1. In general, server 206 supports services for serverless continuous integration and continuous delivery (CI/CD) on cloud platforms optimized for software development, security, and operations (DevSecOps) practices.

Server 206 has a server memory 208 such as volatile memory 112 described with respect to FIG. 1. Server 206 includes, in memory 208, a cognitive module 210 having functionality to receive data, including source code, code for Infrastructure as Code (IaC), playbooks, CI/CD pipeline configuration files, among other data provided and used during CI/CD delivery on cloud platforms, and process this data to detect non-compliance of code with compliance rules and policies of an enterprise and to generate compliance code which updates the source code, the IaC code and other files to comply with compliance rules and policies of an enterprise. Server 206 also includes, in memory 208, continuous integration module 212 having functionality to download source code from a repository and any dependent code required by the source code to execute, compile the source code with the dependent code, build an executable instance of the compiled source code with the dependent code, and test the executable instance of the source code, among other functionality such as performing code analysis. Additionally, server 206 includes a continuous delivery module 214 having functionality to package the build into a deployable image, such as a container or virtual machine (VM) image, configure the deployable image for a runtime environment, and deploy the configured image in the production environment, among other functionality such as load testing.

Server 206 may further include, in memory 208, serverless function module 216 having a serverless function, microservices module 218 have a microservice process, and gateway API module 220 having functionality to support HTTP API requests to the serverless function of serverless function module 216 in embodiments and having functionality to support HTTP API requests to the microservice process of microservices module 218 in alternative embodiments. Each of these modules may be generated by the continuous integration module 212 during CI/CD delivery from one or more source code files 230, compliance code files 236 generated by the cognitive module 210, and other files used during CI/CD delivery on cloud platforms such as pipeline configuration files 238.

Server 206 may further include, in memory 208, test cognitive module 222 having the functionality of cognitive module 210 to receive data, including source code, IaC code, playbooks, CI/CD pipeline configuration files, among other data provided and used during CI/CD delivery on cloud platforms, and process this data to detect non-compliance of code with compliance rules and policies of an enterprise. Test cognitive module 222 is also trained using the same training data used to train cognitive module 210 so that test cognitive module 222 detects non-compliance of code with compliance rules and policies similar to cognitive module 210. Test cognitive module 222 may be trained using new training data, such as crowdsourced training data 228, to verify that the new training data improves the detection of the test cognitive module 222 before the cognitive module 210 may be trained with the new training data.

In embodiments, server 206 of FIG. 2 comprises cognitive module 210, continuous integration module 212, continuous delivery module 214, and test cognitive module 222, each of which may comprise modules of the code of block 200 of FIG. 1. These modules of the code of block 200 are executable by the processing circuitry 120 of FIG. 1 to perform the inventive methods as described herein. Server 206 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG.

2. In practice, the environment may include additional devices and/or networks; fewer devices and/or networks; different devices and/or networks; or differently arranged devices and/or networks than illustrated in FIG. 2.

In accordance with aspects of the invention, FIG. 2 also shows a block diagram of storage 224 which may be storage such as storage 124 of computer 101 described with respect to FIG. 1. Storage 224 may store training data 226 in files for training cognitive module 210. For example, the training data may include a corpus of non-compliant source code, IaC code, playbooks, CI/CD pipeline configuration files, and other non-compliant data provided and used during CI/CD delivery on cloud platforms, and compliance code that updates the source code, the IaC code and other non-compliant files to comply with compliance rules and policies. Storage 224 may also store crowdsourced training data 228 in files for training test cognitive module 222 and cognitive module 210. The crowdsourced training data 228 may include, for example, a corpus of non-compliant source code, IaC code, playbooks, CI/CD pipeline configuration files, and other non-compliant data provided and used during CI/CD delivery on cloud platforms and compliance code that updates the source code, the IaC code and other non-compliant files to comply with compliance rules and policies.

Storage 224 may also store source code 230 files and IaC code 232 files. Source code 230 files may be any programming language source code including Java, JavaScript, Python, Node JS, Golang, or other programming language. IaC code 232 files may include various configuration format files such as HCL, JSON or YAML file formats with functional and/or procedural instructions to provision the configuration of infrastructure components in a runtime environment. For example, storage 224 may store playbooks 234, each a type of IaC code 232 file written in YAML that include declarations specifying the final state infrastructure to provision for the runtime environment. Storage 224 may store other types of pipeline configuration files 238 that are used during CI/CD delivery on cloud platforms such as configuration files for artifacts, stack template files, roles files, and project object model (pom) files for example. Storage 224 may also store runtime processing logs 242 that may be scanned to diagnose the cause of CI/CD pipeline failures such as incorrect syntax, incorrect variable values, job failures and so forth.

Storage 224 may additionally store compliance code 236 and compliance rules and policies files 240. Compliance rules and policies files 240 may include a specification of security standards which are to be followed by serverless module 216, microservices module 218, and/or gateway API module 220, for instance, and be validated before deployment in production. The specification of the security standard may enumerate any number of compliance rules protecting against exposure of various vulnerabilities such as encryption standard and key length for specific data types and information, password protection requirements specifying minimum password length and required inclusion of specific character types, and sets of rules prescribed for different cyber security standards, among other compliance rules for example. Compliance code 236 includes code that updates the source code, the IaC code and other files in the CI/CD pipeline to comply with compliance rules and policies specified in the compliance rules and policies files 240 in the production of, for instance, serverless module 216, microservices module 218, and/or gateway API module 220 for deployment.

In accordance with aspects of the invention, the environment 205 of FIG. 2 also shows user device 246 which may be a computer system such as end user device 103 described with respect to FIG. 1, corporate server 252 which may be a computer system such as remote server 104 described with respect to FIG. 1, and remote server 256 which may be a computer system such as remote server 104 described with respect to FIG. 1, each of which may communicate over WAN 244 which may be a wide area network such as WAN 102 described with respect to FIG. 1. Corporate server 252 may include security and compliance services 254 which may provide the compliance rules and policies files 240 in communication over WAN 244 to server 206 which are stored in storage 224 as shown in FIG. 2.

User device 246 may include integrated development environment (IDE) tools 248 and IaC tools 250 that provide a software development environment among other software development tools for a software developer. The IDE tools 248 may generate source code such as source code 230 which may be any programming language source code including Java, JavaScript, Python, Node JS, Golang, or other programming language, and the IaC tools 250 may generate IaC code such as IaC code 232 which may include various configuration format files such as HCL, JSON or YAML file formats. For example, a software developer may use the IDE tools 248 and IaC tools 250 to write Java code or Java Script for a serverless function, a microservice, and/or a gateway API. In this example, the IDE tools 248 may generate the source code 230 and the IaC tools may generate the IaC code 232 for the serverless module 216, the microservices module 218, and/or the gateway API module 220. In embodiments, the cognitive module 210 may process the source code 230 and the IaC code 232 among other data provided and used in the CI/CD pipeline to detect non-compliance of code with compliance rules and policies of compliance rules and policies files 240 and generate compliance code 236 to update the source code 230 and the IaC code 232 among other non-compliant files to comply with compliance rules and policies.

Remote server 256 may include crowdsourced data aggregator service 258 that provides crowdsourced training data 228 in communication over WAN 244 to server 206. The crowdsourced training data may be anonymized and promotes the inclusion of best of breed solutions on an ongoing basis, independent of where the solutions are developed. Test cognitive module 222 may be trained using the crowdsourced training data 228 to verify that the crowdsourced training data 228 improves the detection of the test cognitive module 222. If the crowdsourced training data 228 improves the detection of the test cognitive module 222, then the cognitive module 210 can be trained using the crowdsourced training data 228, otherwise the crowdsourced training data may be discarded.

Figure 3:
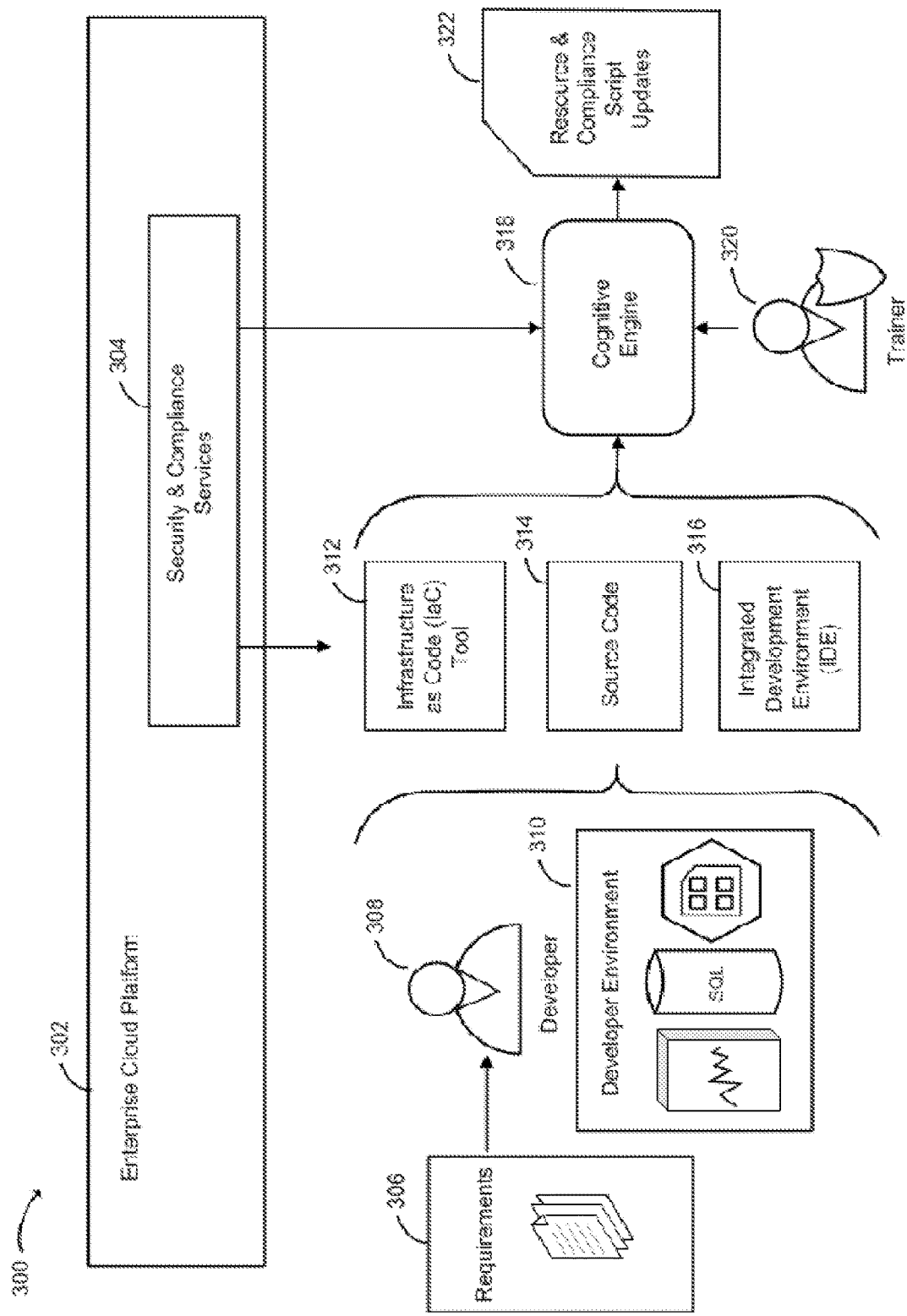
FIG. 3 depicts an illustration of an exemplary workflow in accordance with aspects of the invention.

FIG. 3 depicts an illustration of an exemplary DevSecOps workflow in accordance with aspects of the invention. In an embodiment, the illustration 300 depicts security and compliance services 304 of an enterprise cloud platform 302 providing security and compliance information, such as compliance rules and policies files 240 described with respect to FIG. 2, into a software development pipeline that generates compliance script updates 322 to update the software in the development pipeline to comply with the security and compliance policies of the enterprise. Illustrated in FIG. 3 is a software developer 308 who receives requirements 306 to develop software and uses development tools provided in the developer environment 310 to develop the software according to the requirements 306. As illustrated in FIG. 3, security and compliance information is additionally provided by the security and compliance services 304 of an enterprise cloud platform 302 that must be followed by IaC code generated by the IaC tool 312, the source code 314, and the IDE 316 in the software development pipeline. This security and compliance information is provided to a cognitive engine 318 trained by a trainer 320 to detect non-compliant software and generate compliance script updates 322 to update code in the development pipeline to comply with the security and compliance policies of the enterprise.

Figure 4:
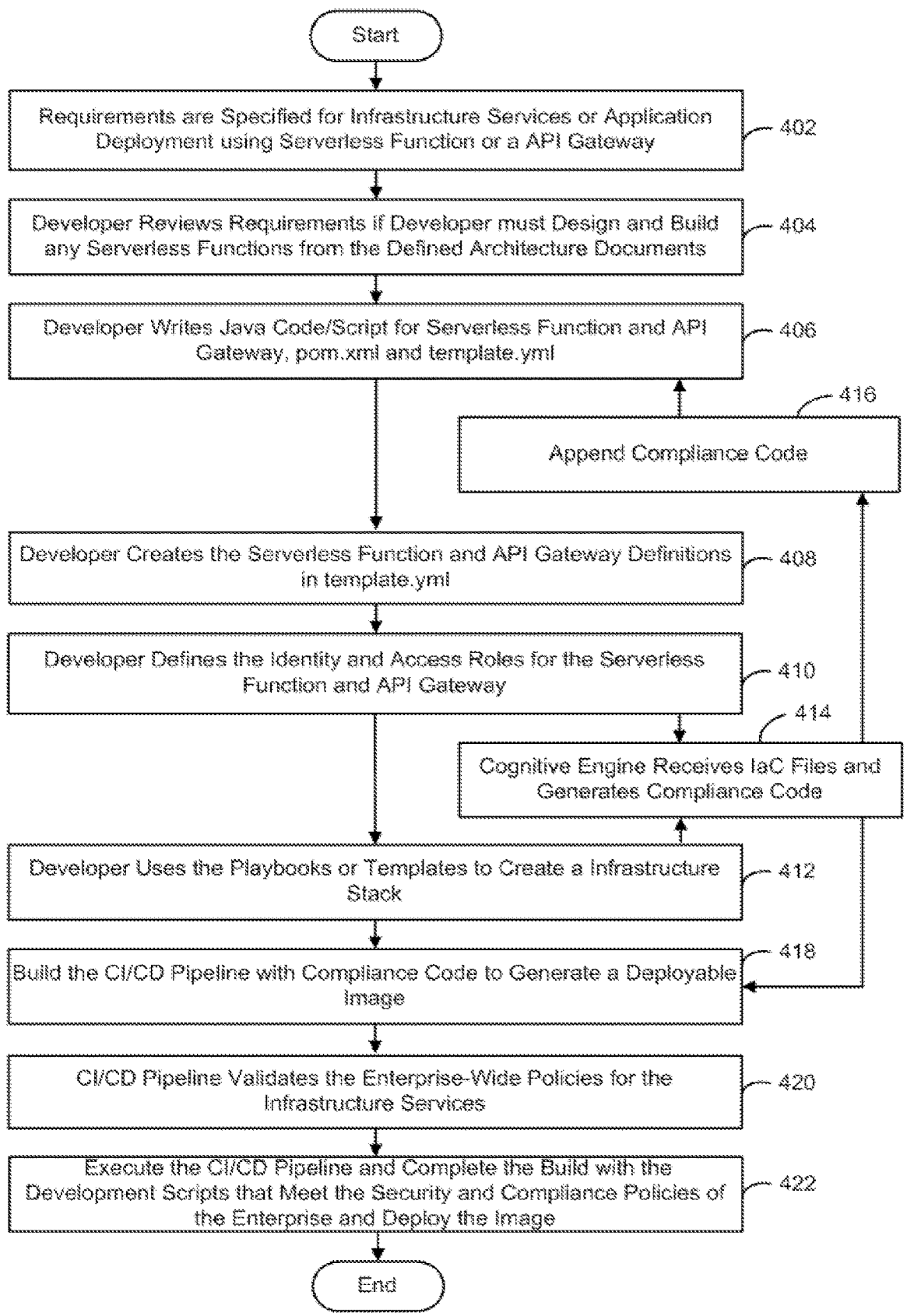
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 402, requirements are specified for infrastructure services or application deployment using a serverless function or an API gateway. The specification of such requirements may initiate a DevSecOps development process. In embodiments, a developer who uses user device 246 with IDE tools 248 and IaC tools 250, as described with respect to FIG. 2, receives the requirements.

At step 404, the requirements are reviewed in reference to any defined architecture documents to identify any serverless functions that must be designed and built. In embodiments, a developer who uses user device 246 with IDE tools 248 and IaC tools 250, as described with respect to FIG. 2, reviews the requirements.

At step 406, source code may be written for the serverless function and API gateway. For example, a developer may write Java code or Java script for the serverless function and the API gateway, a pom.xml file for handling dependencies of a build, and a template.yml file for configuring the service in which the serverless function is defined, the events that trigger the function are specified, and the resources to deploy the function are specified. In embodiments, a developer who uses user device 246 with IDE tools 248 and IaC tools 250, as described with respect to FIG. 2, writes the serverless function and API gateway using IDE tools 248 and IaC tools 250.

At step 408, the serverless function and API gateway definitions are entered in the template.yml. In embodiments, a developer who uses user device 246 with IDE tools 248 and IaC tools 250, as described with respect to FIG. 2, writes the serverless function and API gateway definitions in the template.yml using IDE tools 248 and IaC tools 250.

At step 410, the identity and access roles for the serverless function and API gateway are defined in a roles file. The roles file includes tasks that the role executes, handlers, modules, variables, metadata with role dependencies, template files, among other configuration artifacts. In embodiments, a developer who uses user device 246 with IDE tools 248 and IaC tools 250, as described with respect to FIG. 2, defines the identity and access roles for the serverless function and API gateway in a roles file using IDE tools 248 and IaC tools 250.

At step 412, an infrastructure stack may be defined in a playbook file or in templates. The infrastructure stack models the data center infrastructure by defining the interrelation of system components in the runtime environment. In embodiments, a developer who uses user device 246 with IDE tools 248 and IaC tools 250, as described with respect to FIG. 2, defines the infrastructure stack for the serverless function and API gateway in a playbook file or templates using IDE tools 248 and IaC tools 250.

At step 414, the system receives IaC files and generates compliance code for non-compliant code in the CI/CD pipeline. The compliance code may be one or more compliance script updates for one or more of the source code, IaC code, and/or other CI/CD pipeline code in embodiments to update the non-compliant code to comply with security and compliance policies. In embodiments, and as described with respect to FIG. 2, cognitive module 210 receives IaC files and generates compliance code 236 to update the code in the CI/CD pipeline to comply with compliance rules and policies files 240.

At step 416, the system appends compliance code to non-compliant code files in the CI/CD pipeline. For example, a separate compliance script update with compliance code is appended to an individual file with non-compliant code that may be, in embodiments, a source code file, IaC code file, and/or other CI/CD pipeline code file. In embodiments, and as described with respect to FIG. 2, the cognitive module 210 appends compliance code 236 to a non-compliant code file such as a source code 230 file, IaC code 232 file, or other pipeline configuration file 236 (including playbook file 234) in the CI/CD pipeline for production of, for instance, the serverless module 216, the microservices module 218, and/or the gateway API module 220 for deployment.

At step 418, the system builds the CI/CD pipeline with the compliance code to generate a deployable image. For example, the system compiles the source code and the compliance code with dependent code and builds an executable instance of the compiled code. In embodiments, and as described with respect to FIG. 2, the continuous integration module 212 builds the CI pipeline with the compliance code to generate a deployable image.

At step 420, the system validates enterprise-wide policies for infrastructure services. For example, the system tests the executable instance of the compiled code with the compiled compliance code to validate the compiled code follows compliance rules and policies of an enterprise. In embodiments, and as described with respect to FIG. 2, the continuous integration module 212 tests the executable instance of the compiled code with the compiled compliance code to validate the compiled code follows compliance rules and policies files 240.

At step 422, the system executes the CI/CD pipeline and completes the build with the development scripts that meet the security and compliance policies of an enterprise and deploys the configured image in the production environment. For example, the system completes the build of code, including the compiled compliance code, in the CI/CD pipeline that is validated as compliant with enterprise-wide policies for the infrastructure services. In embodiments, and as described with respect to FIG. 2, the continuous delivery module 214 packages the build into a deployable image, such as a container or virtual machine (VM) image, configures the deployable image for the runtime environment, and deploys the configured image in the production environment.

Figure 5:
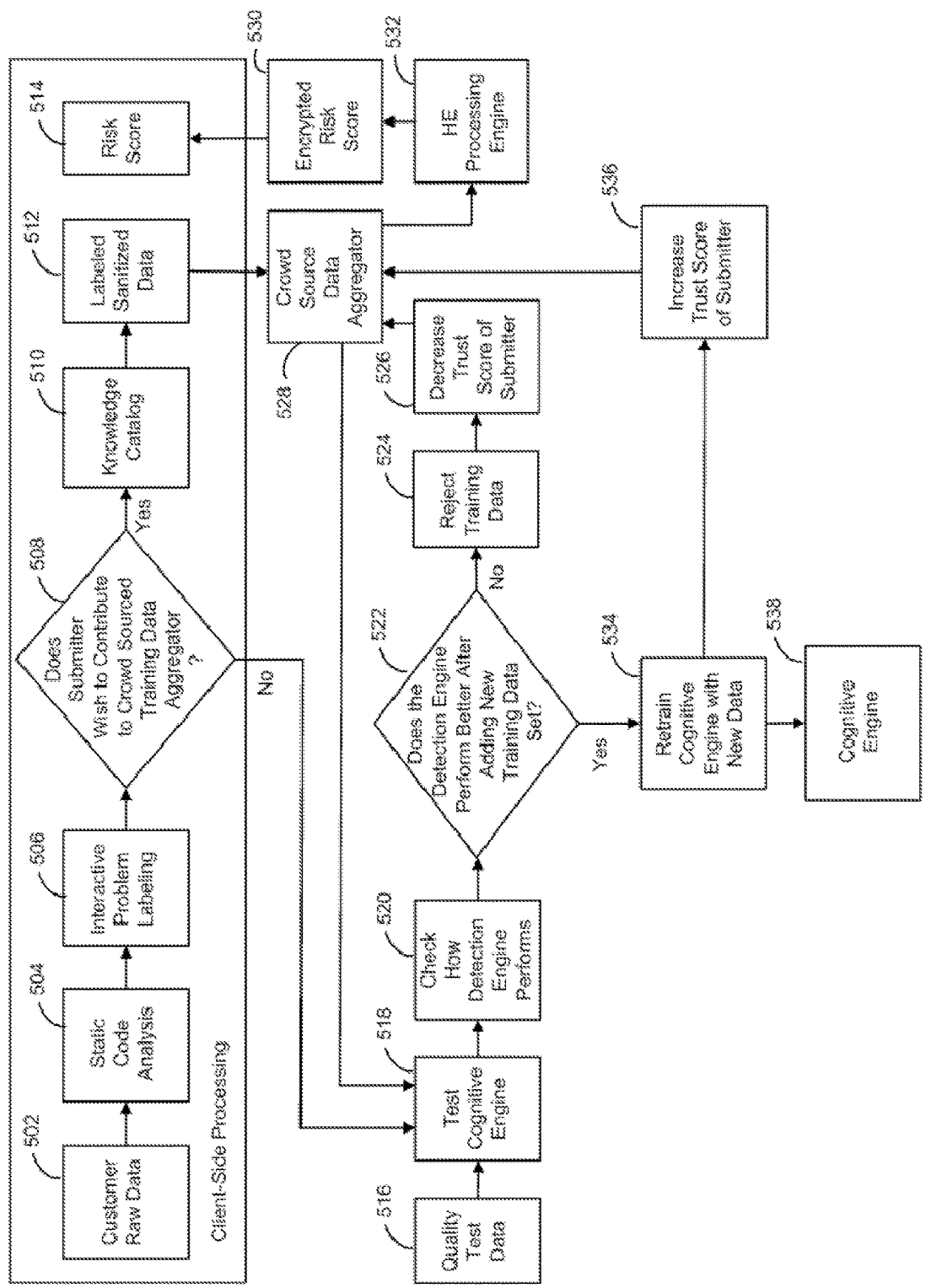
FIG. 5 depicts an illustration of an exemplary process flow diagram in accordance with aspects of the invention.

FIG. 5 depicts an illustration of an exemplary process flow diagram in accordance with aspects of the invention. In embodiments, the process flow diagram of FIG. 5 illustrates the generation of test data from a customer that submits the test data for crowdsourcing used to train the cognitive module. Customer raw data 502 such as source code, IaC code, and/or other pipeline configuration code may be analyzed using static code analysis 504 that identifies a security vulnerability. The customer who develops compliance code for the security vulnerability may label the security vulnerability, also known as interactive problem labeling 506. If the customer decides to contribute the test data for aggregation with crowdsourced training data 508, the training data is sanitized by a knowledge catalog 510 to anonymize customer-specific information and to normalize labeling to provide labeled sanitized data 512. This labeled sanitized data 512 is submitted to a crowdsourced data aggregator 528.

Quality test data 516, curated to establish a benchmark for testing results, may be input to a test cognitive engine 518 with the labeled sanitized data 512 submitted to the crowdsourced data aggregator 528. The performance of the detection engine may be checked as shown at reference numeral 520. For instance, the detection engine performs better if the speed of the detection engine improves, the number of false positives decreases, and/or the number of false negatives decreases. If the detection engine performs better after adding the new training data set as shown at reference numeral 522, the cognitive engine is retrained with the new data as shown at reference numeral 534 and the cognitive engine 538 is ready for use to detect non-compliant code, generate compliance code, and validate compliant code in a CI/CD pipeline. Trust score of the submitter is increased as shown at reference numeral 536 and provided to the crowdsourced data aggregator 528. However, if the performance engine does not perform better after adding the new training data set, the training data is rejected as shown at reference numeral 524 and the trust score of the submitter is decreased as shown at reference numeral 526 and provided to the crowdsourced data aggregator 528.

Additionally, homomorphic encryption (HE) may be used by the crowdsourced data aggregator for crowdsourced data used by the cognitive module to share the data without exposing the unencrypted crowdsourced data. The crowdsourced data aggregator 528 can submit the labeled sanitized data 512 to an HE processing engine 532 to encrypt the labeled sanitized data 512 and then provide the encrypted labeled sanitized data 512 that includes compliance code for the security vulnerability to a customer. The HE processing engine 532 also provides an encrypted risk score 530 that is given to the customer as an unencrypted risk score 514 which indicates a level of risk in using the encrypted compliance code from crowdsourcing.

Furthermore, the crowdsourced data aggregator 528 may store this crowdsourced data on a blockchain. A contributor to the crowdsourced data would have an option, for instance, of setting a cryptocurrency address associated with a submission contributed, and this provides an incentive for companies to share best solutions they research and develop. Another company may use this submission and prevent an attempted attack, saving millions of dollars for that company. By including a smart contract within the blockchain, that company could automatically pay the contributor of that submission a small reward for their contribution.

For example, company A may define a way to check and block a serious new vulnerability that allows an attacker to download all the customer data from a web database. As company A shares this solution with the crowdsourced data aggregator on the blockchain, their cryptocurrency address is linked to this submission. Company B decides to include that submission within their environment. A week later, the intrusion detection system of company B detects a failed attack from someone trying to hack into the database which was prevented by the submission shared by company A. By including the smart contract within the submission, company A might automatically receive a certain sum as a reward for their contribution and the amount of money saved by company B.

Figure 6:
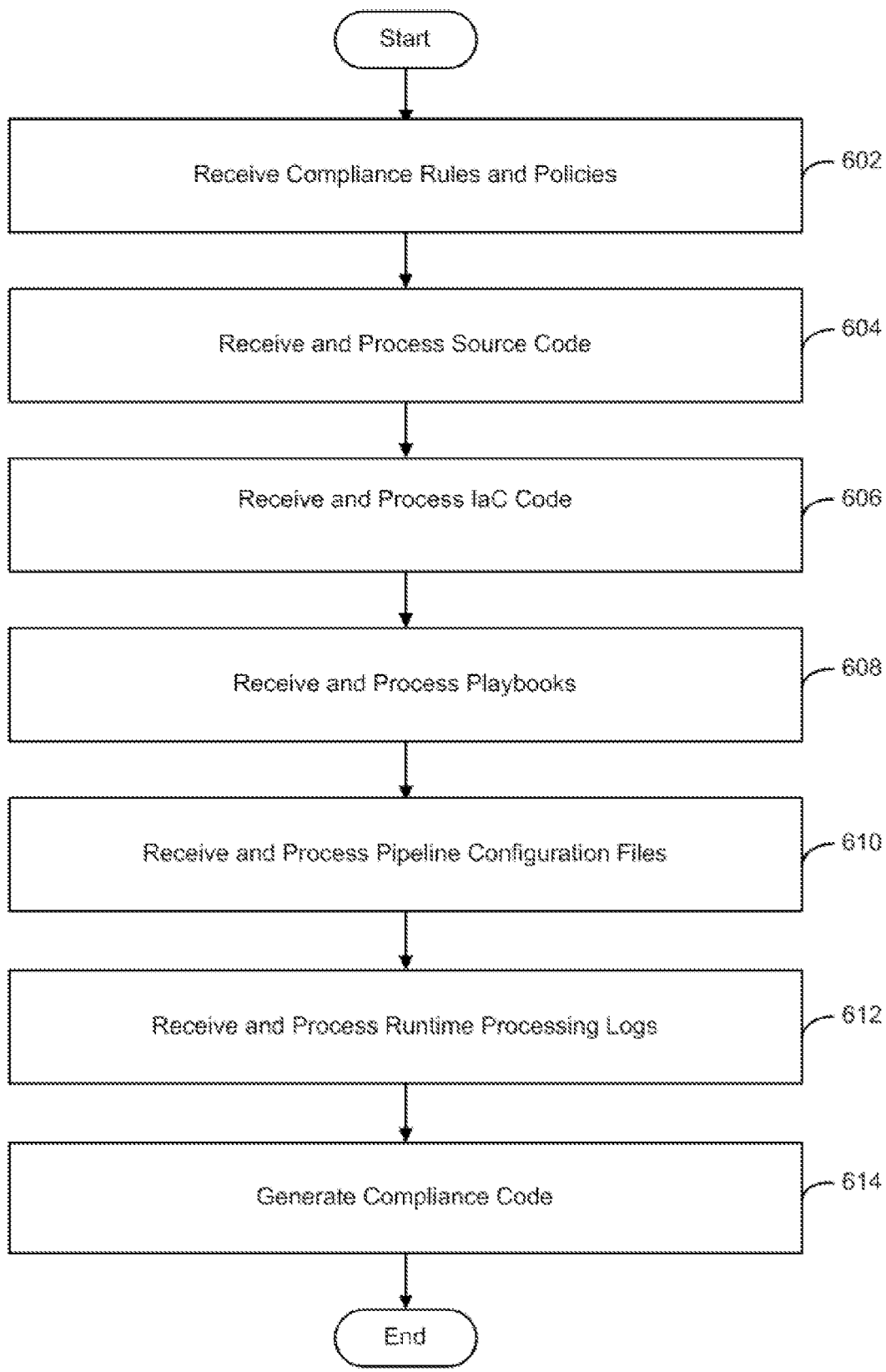
FIG. 6 shows a flowchart of an exemplary method in accordance with aspects of the invention.
Figure 7:
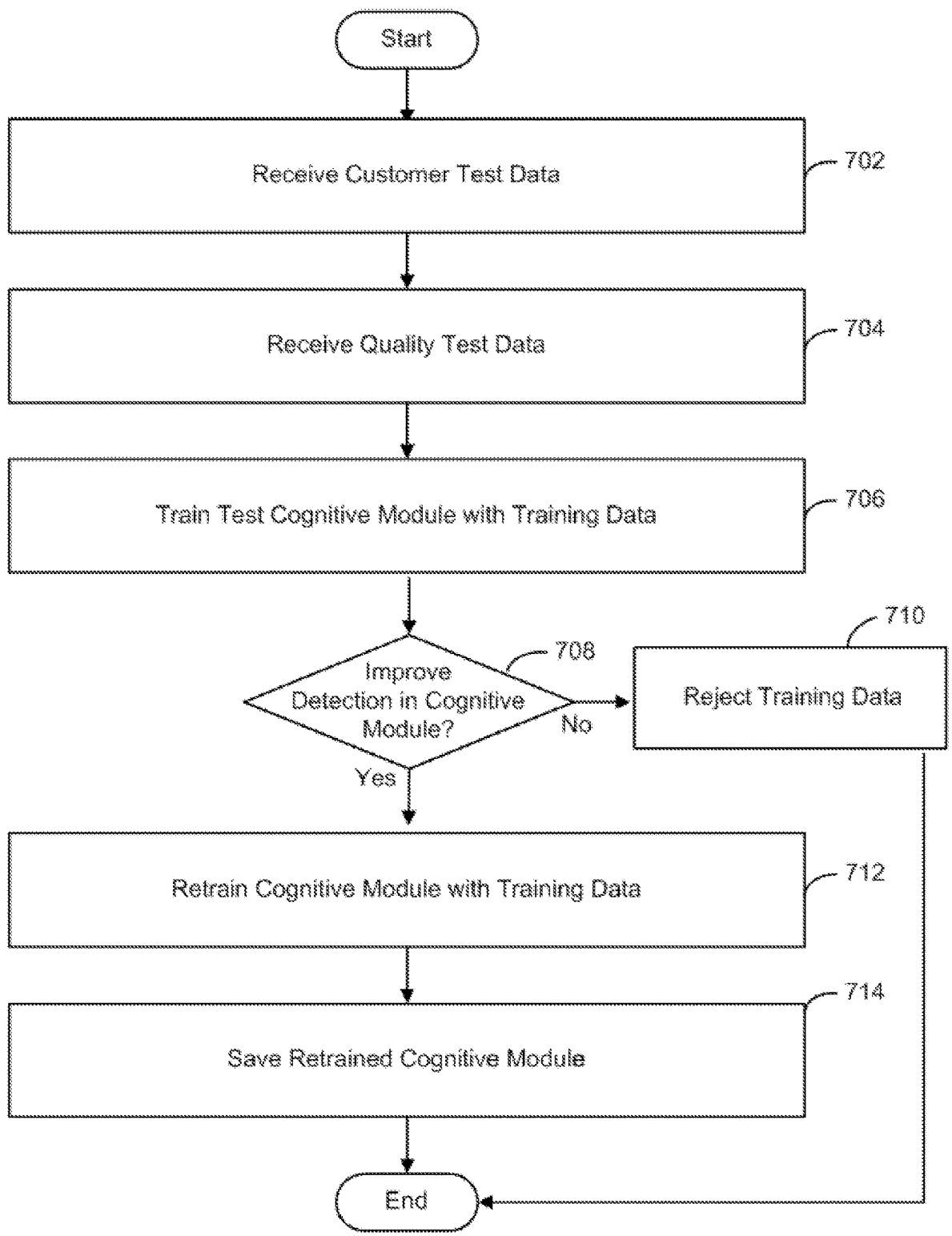
FIG. 7 shows a flowchart of an exemplary method in accordance with aspects of the invention.
Figure 8:
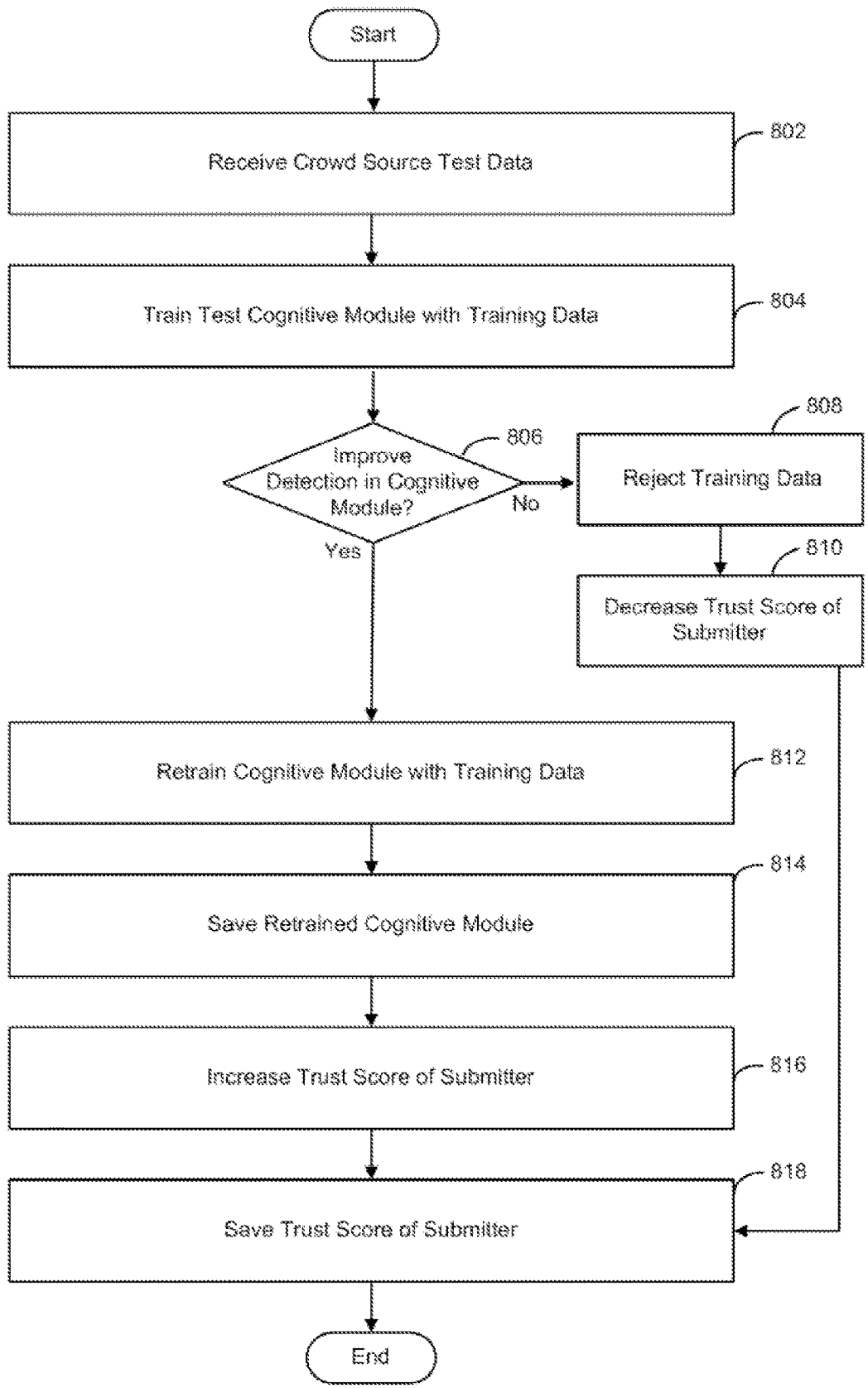
FIG. 8 shows a flowchart of an exemplary method in accordance with aspects of the invention.

FIGS. 6-8 show flowcharts and/or block diagrams that illustrate the architecture, functionality, and operation of possible implementations of systems, methods, and computer program products according to various embodiments of the present invention. As noted above with respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. And some blocks shown may be performed and other blocks not performed, depending upon the functionality involved.

FIG. 6 shows a flowchart of an exemplary method in accordance with aspects of the present invention. Steps of the method may be carried out in the environment of FIG. 2 and are described with reference to elements depicted in FIG. 2. In particular, the flowchart of FIG. 6 shows an exemplary method for generating compliance code to update the code in a CI/CD pipeline to comply with compliance rules and policies in accordance with aspects of the present invention.

At step 602, the system receives compliance rules and policies. For example, there may be a compliance rule specifying for database security that a verified password is required for access to a particular database. As another example, there may be a compliance rule specifying that a firewall for wireless access is configured with specific parameters in edge computing that are not default parameters. The cognitive module, in an embodiment, includes a machine learning model that uses a Long Short Term Memory (LSTM) algorithm initially trained with positive examples of code following a compliance rule, such as code having a database access request after receiving a valid password for access to the database and negative examples of code not following the compliance rule, such as code having a database access request without receiving a valid password for access to the database. The cognitive module can accordingly process code and detects code that is non-compliant with compliance rules. In embodiments, and as described with respect to FIG. 2, the cognitive module 210 receives compliance rules and policies in the compliance rules and policies files 240. Those skilled in the art should appreciate that other Recurring Neural Network algorithms may be used by the machine learning model, including gated recurring unit (GRU).

At step 604, the system receives and processes source code. For example, source code in the CI/CD development pipeline may be input into the cognitive module for processing and detection of non-compliant code. In processing the source code, features are extracted from the source code and compared to features in the machine learning model extracted from examples of non-compliant code during training to detect non-compliant code in the source code. In embodiments, and as described with respect to FIG. 2, the cognitive module 210 receives and processes source code 230.

At step 606, the system receives and processes IaC code. For instance, IaC code in the CI/CD development pipeline may be input into the cognitive module for processing and detection of non-compliant code. In processing the IaC code, features are extracted from the IaC code and compared to features in the machine learning model extracted from examples of non-compliant code during training to detect non-compliant code in the IaC code. In embodiments, and as described with respect to FIG. 2, the cognitive module 210 receives and processes IaC code 232.

At step 608, the system receives and processes playbooks. For example, playbooks in the CI/CD development pipeline may be input into the cognitive module for processing and detection of non-compliant code. In processing the playbooks, features are extracted from the playbooks and compared to features in the machine learning model extracted from examples of non-compliant code during training to detect non-compliant code in the playbooks. In embodiments, and as described with respect to FIG. 2, the cognitive module 210 receives and processes playbooks 234.

At step 610, the system receives and processes other pipeline configuration files in addition to playbooks. For instance, other pipeline configuration files in the CI/CD development pipeline may be input into the cognitive module for processing and detection of non-compliant code. In processing the pipeline configuration files, features are extracted from the pipeline configuration files and compared to features in the machine learning model extracted from examples of non-compliant code during training to detect non-compliant code in the pipeline configuration files. In embodiments, and as described with respect to FIG. 2, the cognitive module 210 receives and processes pipeline configuration files 238.

At step 612, the system receives and processes runtime processing logs. For example, runtime processing logs in the CI/CD development pipeline, including pipeline logs generated during testing in the CI/CD development pipeline, may be input into the cognitive module for processing and detection of non-compliant code. In processing the runtime processing logs, features are extracted from the runtime processing logs and compared to features in the machine learning model extracted from examples of non-compliant code during training to detect non-compliant code in the runtime processing logs. In embodiments, and as described with respect to FIG. 2, the cognitive module 210 receives and processed runtime processing logs 242.

At step 614, the system generates compliance code for non-compliant code detected during processing of code. For instance, the cognitive module 210 may generate code or script to update non-compliant code detected by the machine learning model in processing source code, IaC code, playbooks, other pipeline configuration files, and runtime processing logs. The system can append the compliance code in the file where the non-compliant code was detected. And the system can validate that the code file with the appended compliance code follows security and compliance policies. In embodiments, and as described with respect to FIG. 2, the cognitive module 210 generates compliance code 236 for non-compliant code detected during processing of code.

FIG. 7 shows a flowchart of an exemplary method in accordance with aspects of the present invention. Steps of the method may be carried out in the environment of FIG. 2 and are described with reference to elements depicted in FIG. 2. In particular, the flowchart of FIG. 7 shows an exemplary method for updating the cognitive engine using customer data, in accordance with aspects of the present invention.

At step 702, the system receives customer test data. For example, the customer data may be labeled examples of source code, IaC code, and/or other pipeline configuration code with an identified security vulnerability. In addition, the customer test data may also include update code that remediates the security vulnerability. In embodiments, and as described with respect to FIG. 2, the test cognitive module 222 receives customer test data.

At step 704, the system receives quality test data. The quality test data is curated to establish a benchmark for testing results of the performance of the test cognitive module trained using the customer test data. In embodiments, and as described with respect to FIG. 2, the test cognitive module 222 receives quality test data.

At step 706, the system trains the test cognitive module with the customer test data as training data. The test cognitive module includes the machine learning model that uses the LSTM algorithm which was initially trained with the quality test data including positive examples of code following a compliance rule and negative examples of code not following the compliance rule. The system trains the test cognitive model with the customer data that may include positive examples of code without the identified security vulnerability and/or negative examples of code with the identified security vulnerability. In embodiments, and as described with respect to FIG. 2, the server 206 trains the test cognitive module 222 with the customer test data as training data.

At step 708, the system determines whether detection is improved in the test cognitive module after training with the customer test data as training data. For example, the test cognitive module performs better if the speed of detection improves, the number of false positives decreases, and/or the number of false negatives decreases. If detection is not improved in the test cognitive module, the system rejects the training data at step 710 and processing is finished. If detection is improved in the test cognitive module, carrying out steps of the exemplary method continue at step 712. In embodiments, and as described with respect to FIG. 2, the server 206 determines whether detection is improved in the test cognitive module 222 after training with the customer test data as training data.

At step 712, the system retrains the cognitive module with the customer test data as training data. In an embodiment, the machine learning model of the cognitive module uses the LSTM algorithm and is trained with the customer data that may include positive examples of code without the identified security vulnerability and/or negative examples of code with the identified security vulnerability. In embodiments, and as described with respect to FIG. 2, the server 206 trains the cognitive module 210 with the customer test data as training data.

At step 714, the system saves the retrained cognitive module and, in embodiments, the customer training data. In addition to learning security vulnerabilities through training, the cognitive module may learn as it processes code throughout iterations of code development in CI/CD pipelines for an individual enterprise. In this way, the cognitive module can become customized by and for the individual enterprise. In embodiments, and as described with respect to FIG. 2, the server 206 saves the retrained cognitive module 210 in persistent storage such as persistent storage 113 described with respect to FIG. 1. And the updated cognitive engine is ready for use to detect non-compliant code, generate compliance code, and validate compliant code in a CI/CD pipeline.

FIG. 8 shows a flowchart of an exemplary method in accordance with aspects of the present invention. Steps of the method may be carried out in the environment of FIG. 2 and are described with reference to elements depicted in FIG. 2. In particular, the flowchart of FIG. 8 shows an exemplary method for updating the cognitive engine using crowdsourced data, in accordance with aspects of the present invention.

At step 802, the system receives crowdsourced test data. For example, the crowdsourced test data may be labeled examples of source code, IaC code, and/or other pipeline configuration code with an identified security vulnerability. In addition, the crowdsourced test data may also include update code that remediates the security vulnerability. The crowdsourced test data may be sanitized to anonymize customer-specific information and labeling may be normalized to provide labeled sanitized data. In embodiments, and as described with respect to FIG. 2, the test cognitive module 222 receives crowdsourced test data.

At step 804, the system trains the test cognitive module with the crowdsourced training data. The test cognitive module includes the machine learning model that uses the LSTM algorithm, and the system trains the test cognitive model with the crowdsourced training data that may include positive examples of code without the identified security vulnerability and/or negative examples of code with the identified security vulnerability. In embodiments, and as described with respect to FIG. 2, the server 206 trains the test cognitive module 222 with the crowdsourced training data.

At step 806, the system determines whether the detection is improved in the test cognitive module after training with the crowdsourced training data. For example, the test cognitive module performs better if the speed of detection improves, the number of false positives decreases, and/or the number of false negatives decreases. If detection is not improved in the test cognitive module, the system rejects the training data at step 808 and carrying out steps of the exemplary method continue at step 810. If detection is improved in the test cognitive module, carrying out steps of the exemplary method continue at step 812. In embodiments, and as described with respect to FIG. 2, the server 206 determines whether detection is improved in the test cognitive module 222 after training with the crowdsourced training data.

At step 810, the system decreases the trust score of the submitter since detection was not improved in the test cognitive module and carrying out steps of the exemplary method continue at step 818. The trust score enables and supports setting thresholds for selecting submitters of crowdsourced updates to be included in future integrations. In embodiments, and as described with respect to FIG. 2, the server 206 decreases the trust score of the submitter when the detection is not improved in the test cognitive module 222 after training with the crowdsourced training data.

At step 812, the system retrains the cognitive module with the crowdsourced training data if detection was improved in the test cognitive module at step 806. In an embodiment, the machine learning model of the cognitive module uses the LSTM algorithm and is trained with the crowdsourced training data that may include positive examples of code without the identified security vulnerability and/or negative examples of code with the identified security vulnerability. In embodiments, and as described with respect to FIG. 2, the server 206 trains the cognitive module 210 with the crowdsourced training data.

At step 814, the system saves the retrained cognitive module and, in embodiments, the crowdsourced training data. In embodiments, and as described with respect to FIG. 2, the server 206 saves the retrained cognitive module 210 in persistent storage such as persistent storage 113 described with respect to FIG. 1. And the updated cognitive engine is ready for use to detect non-compliant code, generate compliance code, and validate compliant code in a CI/CD pipeline.

At step 816, the system increases the trust score of the submitter. In embodiments, and as described with respect to FIG. 2, the server 206 increases the trust score of the submitter when the detection is improved in the test cognitive module 222 after training with the crowdsourced training data. And, at step 818, the system saves the trust score of submitter. In embodiments, and as described with respect to FIG. 2, the server 206 saves the trust score of the submitter.

In this way, new or updated solutions to identify security vulnerabilities in embodiments of the present disclosure are assessed through the test cognitive engine. Those solutions that improve the overall security posture of a company are likely to be adopted and those solutions that do not are discarded. Advantageously, the cognitive engine can leverage crowdsourced anonymized data to provide immediate training and value to new implementers of embodiments of the present disclosure. Furthermore, embodiments of the present disclosure enable inclusion of best of breed solutions on an ongoing basis whether developed in-house or externally by other companies.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a processor, a plurality of infrastructure as code files specifying a configuration of a runtime environment for a deployable image of source code in a continuous integration and continuous delivery pipeline for a cloud platform;
inputting, by the processor, features of the plurality of infrastructure as code files into a machine learning model, wherein the machine learning model is trained using positive examples of code following a compliance rule and negative examples of another code not following the compliance rule;
generating, by the processor, compliance code for at least one file of the plurality of infrastructure as code files;
building, by the processor, the deployable image of the source code in the continuous integration and continuous delivery pipeline according to the configuration specified by the plurality of infrastructure as code files and the compliance code; and
deploying, by the processor, an instance of the image in the runtime environment.

2. The method of claim 1, further comprising receiving, by the processor, the source code in the continuous integration and continuous delivery pipeline for the cloud platform.

3. The method of claim 2, wherein the source code is selected from the group consisting of source code of a serverless function, source code of a microservice, and source code of an API gateway.

4. The method of claim 1, further comprising appending the compliance code to the at least one file.

5. The method of claim 1, further comprising:
receiving, by the processor, compliance rules of security and compliance policies; and
detecting, by the processor, code in the at least one file of the plurality of infrastructure as code files that does not follow a compliance rule.

6. The method of claim 1, further comprising:
generating, by the processor, additional compliance code for the source code; and
compiling, by the processor, the source code with the additional compliance code.

7. The method of claim 1, further comprising validating, by the processor, that the plurality of infrastructure as code files with the compliance code follows security and compliance policies.

8. The method of claim 1, further comprising:
detecting, by the processor, from the machine learning model the at least one file of the plurality of infrastructure as code files that does not follow the compliance rules of the security and compliance policies.

9. The method of claim 8, wherein the detecting comprises comparing the features of each of the plurality of infrastructure as code files by the machine learning model with extracted features of negative examples of code not following a compliance rule.

10. The method of claim 1, wherein the-machine learning model uses a Long Short Term Memory (LSTM) algorithm, and the negative examples of another code not following the compliance rule comprise a security vulnerability.

11. The method of claim 10, wherein the positive examples of code following the compliance rule and the negative examples of the another code not following the compliance rule are crowdsourced.

12. The method of claim 1, wherein the plurality of infrastructure as code files includes one or more playbooks.

13. A computer program product comprising one or more computer readable storage media having program instructions collectively stored on the one or more computer readable storage media, the program instructions executable to:

input features of each of a plurality of code files in a continuous integration and continuous delivery pipeline for a cloud platform into a machine learning model, wherein the machine learning model is initially trained with positive examples of code following a compliance rule and negative examples of another code not following the compliance rule;

build a deployable image of source code in the continuous integration and continuous delivery pipeline according to a configuration of a runtime environment specified by the plurality of code files, including the at least one of the plurality of code files incorporating compliance code that remediates the security vulnerability and excludes non-compliant code; and deploy an instance of the image in the runtime environment.

14. The computer program product of claim 13, wherein the plurality of code files includes infrastructure as code files.

15. The computer program product of claim 13, wherein the program instructions are further executable to generate the compliance code for the at least one of the plurality of code files.

16. The computer program product of claim 13, wherein the source code is selected from the group consisting of source code of a serverless function, source code of a microservice, and source code of an API gateway.

17. A system comprising:

a processor set, one or more computer readable storage media, and program instructions collectively stored on the one or more computer readable storage media, the program instructions executable to:

input features of at least one file of a plurality of infrastructure as code files into a machine learning model, wherein the machine learning model is trained using positive examples of code following a compliance rule and negative examples of another code not following the compliance rule;

append compliance code that follows a compliance rule of security and compliance policies to the at least one file of the plurality of infrastructure as code files; and deploy in a runtime environment a deployable image of source code in a continuous integration and continuous delivery pipeline according to a configuration of the runtime environment specified by the plurality of infrastructure as code files, including the at least one file appended with the compliance code that follows the compliance rule.

18. The system of claim 17, wherein the program instructions are further executable to generate the compliance code for the at least one file of the plurality of infrastructure as code files.

19. The system of claim 17, wherein the program instructions are further executable to validate that the plurality of infrastructure as code files, including the at least one file appended with the compliance code that follows the compliance rule, follow compliance rules of the security and compliance policies.

20. The system of claim 17, wherein the machine learning model uses a Long Short Term Memory (LSTM) algorithm, and is trained using crowdsourced data.

\* \* \* \* \*